J. LONGANECKER & L. G. STOCKBERGER.
TROLLEY WHEEL.
APPLICATION FILED APR. 4, 1917.

1,267,338.

Patented May 21, 1918.

Inventors
JOHN LONGANECKER
LOUIE G. STOCKBERGER

By John A. Bomrhardt
Attorney

UNITED STATES PATENT OFFICE.

JOHN LONGANECKER AND LOUIE G. STOCKBERGER, OF HIRAM, OHIO; SAID STOCK-BERGER ASSIGNOR OF ONE-SIXTH OF HIS RIGHT TO SAID LONGANECKER.

TROLLEY-WHEEL.

1,267,338.

Specification of Letters Patent.

Patented May 21, 1918.

Application filed April 4, 1917. Serial No. 159,645.

*To all whom it may concern:*

Be it known that we, JOHN LONGANECKER and LOUIE G. STOCKBERGER, citizens of the United States, residing at Hiram, in the county of Portage and State of Ohio, have invented certain new and useful Improvements in Trolley-Wheels, of which the following is a specification.

This invention relates to trolley wheels and has for its object to provide an improved wheel for the transmission of electricity to vehicles, the wheel comprising two sections, which are yielding with respect to each other, so that they will be pressed to close contact with a wire running therebetween. Novel means are also provided for cutting sleet and ice from the wire as the wheel travels along the same.

The invention is illustrated in the accompanying drawings in which—

Figure 1:
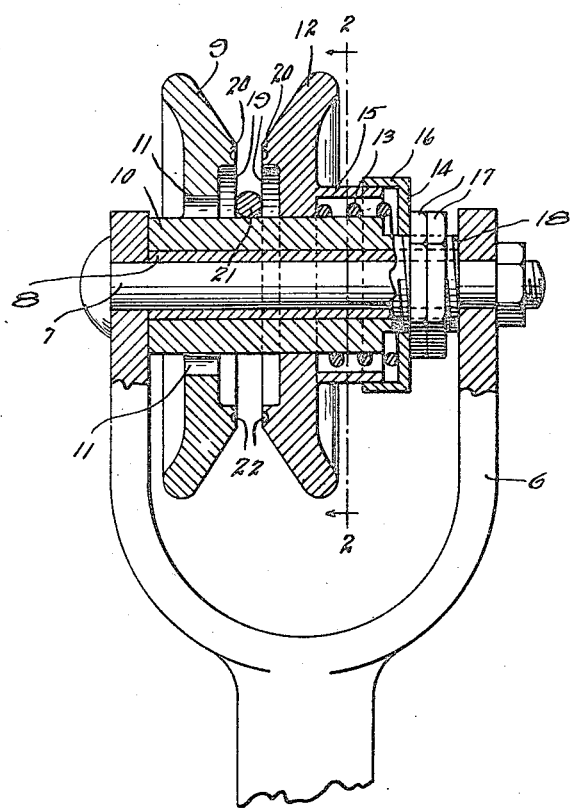
Figure 1 is a vertical section of the wheel.
Figure 2:
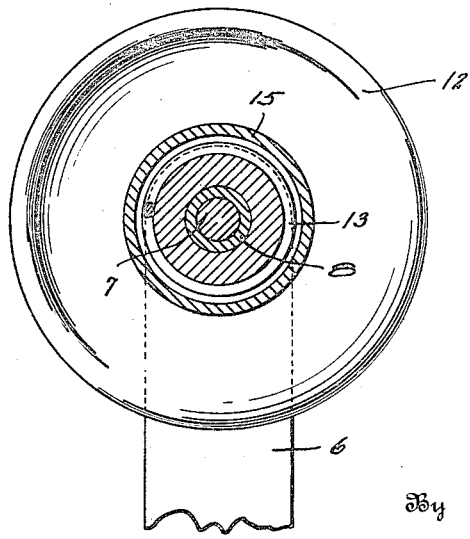
Fig. 2 is a cross section on the line 2—2 of Fig. 1.

Referring specifically to the drawings, 6 indicates the fork and 7 the axle bolt or pin on which the wheel is mounted, with a bushing 8 surrounding the axle.

The wheel comprises two sides or sections. One section, which we will designate the fixed section, is indicated at 9 and this is integral with an elongated hub 10 which revolves on the bushing. Openings 11 are provided in the flange of the wheel, at the hub, to allow the escape of water or dirt. The movable section is indicated at 12, and it is sleeved upon the extension of the hub 10, and it is pressed toward the section 9 by a spring 13 coiled around the hub, the spring being seated at the outer end against a flanged ring 14. The wheel section has a circular flange 14 which telescopes in the flange 16 on the ring 14, thereby forming a housing for the spring. The ring 14 may be adjusted, to vary the tension of spring, by means of nuts 17 which screw on the reduced threaded end 18 of the hub, the hub abutting at its opposite ends against the arms of the fork. The adjacent or inner faces of the wheel sections 9 and 12 are provided with annular recesses 19 at the central part thereof, and these recesses produce cutting edges 20 which contact with the wire 21 when the wheel is applied thereto, and by the rotation of the wheel serve to strip or cut sleet from the wire, said edges having a shearing action across the sides of the wire as the wheel travels along the same.

Adjacent the edges 20 the wheel sections may have annular grooves 22 which may be filled with graphite or the like, to lubricate the contacting surfaces between the wheel and the wire.

In the use of the device, when the wheel is applied to the wire the latter enters the space between the wheel sections, making contact both with the sections and with the hub, the movable section 12 being swung outwardly a sufficient distance to admit the wire between the sections, as shown in Fig. 1. The spring then holds the opposite sections in close contact with the wire, giving a good electrical connection, and in winter the edges 20 above referred to act to strip sleet from the wire as above described. The spring will yield sufficiently to permit the wheel to take turns in the wire without throwing the trolley off.

We claim:

A trolley wheel comprising a hub, a side section fixed thereto, an opposite movable section sleeved on the hub and having an outwardly projecting flange surrounding the hub, an adjustable ring on the hub having an inwardly projecting flange which laps the flange on the movable section, a nut threaded on the hub outside of said ring, to adjust the position of said ring, and a spring in compression between the ring and the loose section, and inclosed by said flanges.

In testimony whereof, we do affix our signatures in presence of two witnesses.

JOHN LONGANECKER.
LOUIE G. STOCKBERGER.

Witnesses:
WM. WHITE,
LIDA LONGANECKER.